United States Patent
Gray et al.

(10) Patent No.: US 10,452,835 B2
(45) Date of Patent: Oct. 22, 2019

(54) USER-MANAGEMENT OF THIRD-PARTY USER INFORMATION

(71) Applicant: Microsoft Technology Licensing, LLC, Redmond, WA (US)

(72) Inventors: David Michael Gray, Bellevue, WA (US); Hubert Van Hoof, Seattle, WA (US); Nicholas Wrem, Seattle, WA (US); David J. Brennan, Redmond, WA (US); Brent Gilbert, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 15/199,918

(22) Filed: Jun. 30, 2016

(65) Prior Publication Data
US 2018/0004932 A1 Jan. 4, 2018

(51) Int. Cl.
*H04L 29/06* (2006.01)
*G06F 21/45* (2013.01)

(52) U.S. Cl.
CPC .......... *G06F 21/45* (2013.01); *H04L 63/0421* (2013.01); *H04L 63/102* (2013.01)

(58) Field of Classification Search
CPC ..... G06F 21/45; H04L 63/0884; H04L 9/321; H04L 67/3061; H04L 9/3228; H04L 67/22; H04L 63/0421; G06Q 30/02; G06Q 50/01
See application file for complete search history.

(56) References Cited

U.S. PATENT DOCUMENTS

| 6,961,858 B2 | 11/2005 | Fransdonk |
| 7,016,877 B1 | 3/2006 | Steele et al. |

(Continued)

FOREIGN PATENT DOCUMENTS

| CA | 2605477 A1 | 10/2006 |
| CN | 102474507 A | 5/2012 |

(Continued)

OTHER PUBLICATIONS

Achieving User Privacy in Mobile Networks, Askwith et al. (Year: 1997).*

(Continued)

*Primary Examiner* — Alexander Lagor
*Assistant Examiner* — Vu V Tran
(74) *Attorney, Agent, or Firm* — Michael Best & Friedrich LLP

(57) ABSTRACT

Systems and methods for generating and broadcasting a dynamic identifier are presented. Based on the current context and rules established for accessing personal information, a dynamic identifier corresponding to a computer user is dynamically generated and provided to a computing device corresponding to the computer user. The computing device may broadcast the dynamic identifier to others. Upon receipt of a dynamic identifier, a party wishing to determine information regarding the broadcasting party must query an information service with the dynamic identifier. According to a set of rules and/or permissions established for the target computer user (broadcasting the dynamic identifier), accessible information is identified and returned to the requesting party. Additionally, a user is provided with the ability to edit, add to, and/or delete information that is stored by the identification service regarding the user on behalf of a submitting party.

17 Claims, 10 Drawing Sheets

(56) References Cited

U.S. PATENT DOCUMENTS

| | | |
|---|---|---|
| 7,069,319 B2 | 6/2006 | Zellner et al. |
| 7,991,843 B2 | 8/2011 | Guo et al. |
| 8,259,719 B2 | 9/2012 | Sharma et al. |
| 8,842,815 B2 | 9/2014 | Connelly et al. |
| 9,100,435 B2 | 8/2015 | Hamilton et al. |
| 9,185,167 B2 | 11/2015 | Connolly |
| 9,226,117 B2 | 12/2015 | Vos et al. |
| 10,051,075 B1* | 8/2018 | Kothari ............... H04L 61/2596 |
| 2003/0169885 A1 | 9/2003 | Rinaldi |
| 2004/0123106 A1 | 6/2004 | D'Angelo et al. |
| 2004/0205198 A1* | 10/2004 | Zellner ............... H04L 63/0281 709/228 |
| 2005/0267766 A1* | 12/2005 | Galbreath ............... G06Q 30/02 705/319 |
| 2008/0182548 A1 | 7/2008 | Pattison et al. |
| 2009/0234857 A1 | 9/2009 | Barault et al. |
| 2010/0268603 A1 | 10/2010 | Nolet et al. |
| 2013/0282438 A1 | 10/2013 | Hunter et al. |
| 2014/0162601 A1* | 6/2014 | Kim ..................... H04W 12/06 455/411 |
| 2015/0050977 A1 | 2/2015 | Omar |
| 2015/0088603 A1 | 3/2015 | Romero et al. |
| 2015/0186660 A1* | 7/2015 | Sherrets ................ G06F 21/604 726/30 |
| 2016/0156638 A1 | 6/2016 | Somani et al. |
| 2017/0270783 A1* | 9/2017 | Mendiola ............... G08G 1/123 |

FOREIGN PATENT DOCUMENTS

| | | |
|---|---|---|
| EP | 2449502 A1 | 5/2012 |
| EP | 2456238 A1 | 5/2012 |
| WO | 2013009815 A2 | 1/2013 |

OTHER PUBLICATIONS

Personalization in Privacy-Aware Highly Dynamic Systems, Sackmann et al. (Year: 2006).*

"International Search Report and Written Opinion Issued in PCT Application No. PCT/US2017/024646", dated Jun. 20, 2017, 11 Pages.

Katsaros, et al., "Wireless Information Highways", in Publication of IGI, Dec. 31, 2004, 3 pages.

* cited by examiner

USER-MANAGEMENT OF THIRD-PARTY USER INFORMATION

BACKGROUND

Using personal mobile computing devices, people are able to broadcast an identifier in order to indicate their presence at a given venue. Such broadcasts may be made for one (or more) of several reasons: create an opportunity to communicate with others (e.g., family, friends, associates, peers, acquaintances, etc.), obtain services (e.g., indicating presence to obtain networking abilities with a beacon or router, offers from a store, etc.) Examples of personal broadcasts include broadcasting an identifier while a store and receiving various offers via the mobile computing device, or broadcasting an identifier in a large conference and receiving notice that a friend is also attending (and maybe the location of that friend).

While there are many instances in which a person may wish to broadcast an identifier, there are also instances in which that person may NOT want to broadcast an identifier and still receive some services/benefits that are available. It is easy to imagine instances in which the person does not wish to be known when entering a particular venue, but still receive some level of benefits, e.g., those associated with unknown parties. However, in broadcasting an identifier, there is currently only 2 options: (1) broadcast your identity—and people and/or services may learn more about you whether you wish them to or not, or (2) not broadcast your identity—and you do not make connections that you may wish to make or receive services/benefits that are otherwise available.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems and methods for generating and broadcasting a dynamic identifier are presented. Based on the current context and rules established for accessing personal information, a dynamic identifier corresponding to a computer user is dynamically generated and provided to a computing device corresponding to the computer user. The computing device may broadcast the dynamic identifier to others. Upon receipt of a dynamic identifier, a party wishing to determine information regarding the broadcasting party must query an information service with the dynamic identifier. According to a set of rules and/or permissions established for the target computer user (broadcasting the dynamic identifier), accessible information is identified and returned to the requesting party. Additionally, a user is provided with the ability to edit, add to, and/or delete information that is stored by the identification service regarding the user on behalf of a submitting party.

According to aspects of the disclosed subject matter, a computer-implemented method, as may be implemented by an identification service, is presented. As a part of the method a data store is maintained, where the data store stores user information regarding a plurality of computer users on behalf of one or more submitting parties. User information corresponding to a user is received from a submitting party. The user information is received in conjunction with a current dynamic user identifier associated with the user. An instruction to present the user information to the user is received and the user information is then provided to the user. In response, modified user information is received from the user. The modified user information comprises the user information provided to the user as modified by the user. The user information is then stored in the data store in association with the user.

According to additional aspects of the disclosed subject matter, a computer-medium bearing computer-executable instructions is presented. The instructions, when executed by a processor on a computing device, configure the computing device to carry out a method as implemented by an identification service for managing user information regarding a user. According to aspects of the disclosed subject matter, the method comprises maintaining a data store that stores user information regarding a plurality of computer users on behalf of submitting parties. User information corresponding to a user of the plurality of users is received from a submitting party. The user information is received in conjunction with a current dynamic user identifier associated with the user. An instruction to present the user information to the user is received and, in response, the requested user information is provided to the user. In response to presenting the user information to the user, modified user information from the user is received. The modified user information comprises the user information provided to the user as modified by the user. In response to receiving the modified user information, the modified user information is stored in the data store in association with the user.

According to still further aspects of the disclosed subject matter, a computer system for managing user information from third party submitters in regard to a plurality of users is presented. The system comprises a processor and a memory, wherein the processor executes instructions stored in the memory as part of or in conjunction with at least an executable information service module. In execution, the information service module maintains user information in a data store regarding a plurality of users on behalf of one or more submitting parties. Additionally, the information service module receives user information corresponding to a first user of the plurality of users from a first submitting party, where the user information is received in conjunction with a current dynamic user identifier associated with the first user. Further, an instruction to present the received user information to the first user is received and the requested/instructed user information is provided to the first user. In response to providing the first user with the user information, modified user information is received from the first user, where the modified user information comprises the received user information provided to the user as modified by the first user. Thereafter, the user information is stored in the data store in association with the first user.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
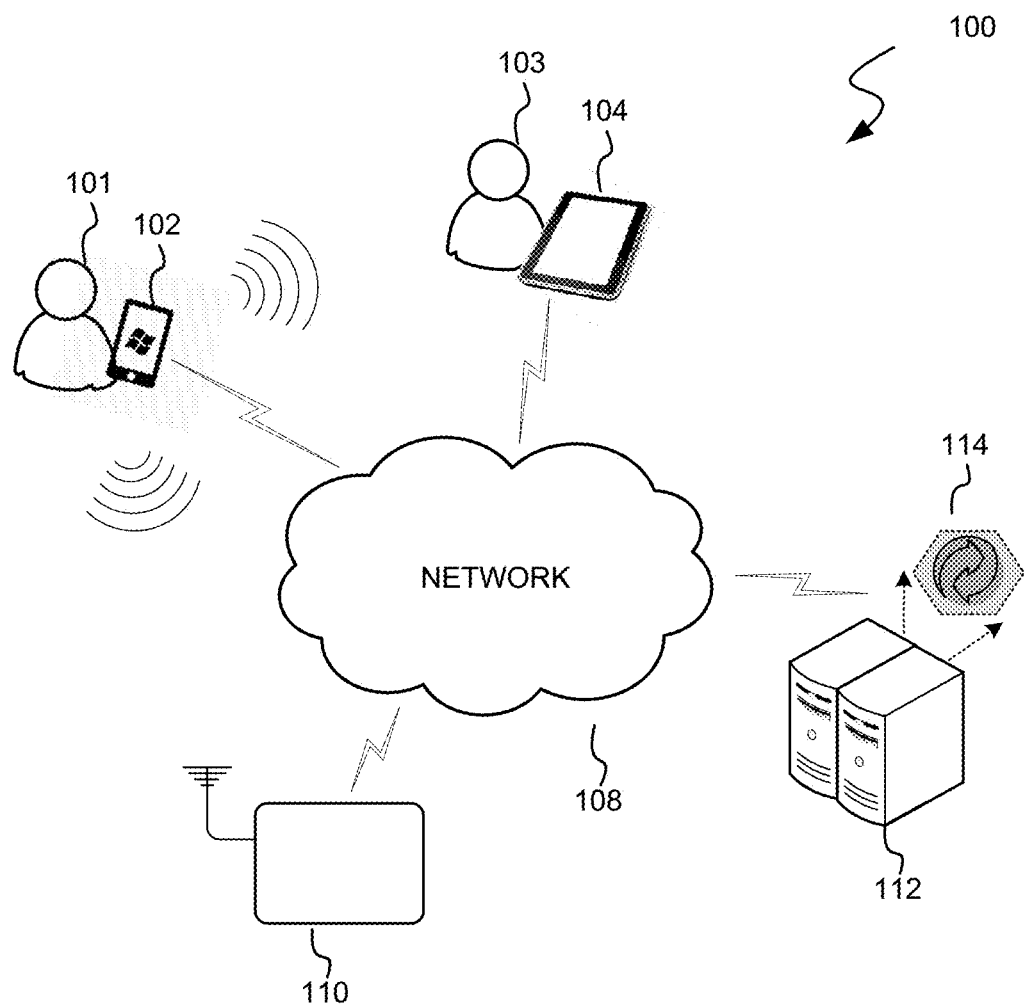
FIG. 1 is a pictorial diagram illustrating an exemplary network environment suitable for implementing aspects of the disclosed subject matter.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

In in accordance with aspects of the disclosed subject matter, a personal mobile device corresponding to a person (referred to as a "user") broadcasts a dynamic value as an identifier of that person/user. The dynamic value of the identifier, referred to as a dynamic identifier, changes according to triggering events. In addition to simply being a tag to identify the person/user, the dynamic identifier may include or be encoded with information such as, but not limited to, an identity type or profile (e.g., a generic consumer identifier/profile used when entering within an unknown or unapproved commercial establishment vs. a consumer profile used when entering a commercial establishment that the person/user often frequents, or a professional profile when entering the user's workplace), identity server data that provides information identifying the server that provided the dynamic identifier, and/or identity content data that may include information regarding the user/person. In regard to the identify server data, this information may be organized in various manners, including a DNS-like system (domain name system), for uniquely identifying the originating server/service of the dynamic identifier.

In broadcasting the dynamic identifier, the corresponding user may maintain control of the personal information that is available to those receiving the dynamic identifier through a set of rules and controls that are associated with the user. Indeed, due to the dynamic nature of the dynamic identifier a recipient of the dynamic value/identifier must query an identification service in order to obtain identifying information regarding the corresponding user of the dynamic identifier. The identification service provides each participating user of the identification service with the ability to establish the set of rules and preferences for controlling third party access to that user's personal information, including any static identifier associated with the user. Typically, but not exclusively, the identification service provides the dynamic values to the personal mobile device of a user according to the triggering events that occur with regard to the user. Since the dynamic identifier of a user changes, local tracking by others (people and/or services) of the user by way of the dynamic identifier is frustrated or, alternatively, controlled by the user.

Indeed, according to aspects of the disclosed subject matter and as set forth below: parties receiving the dynamic identifier can submit information regarding the user to the service for storage for the submitting party. For example, a vendor may wish to aggregate information regarding a particular user's preferences and purchases. The vendor may submit the data regarding the particular user (or in regard to a particular profile/identity/context of the user) to the identification service for storage on behalf of the vendor.

Additionally, the identification service provides the ability to the user to examine and/or modify the data/information that a submitting party maintains on the service in regard to the user. As will be described in greater detail below, examination and/or modification of the data may be conducted synchronously with the submission of information about the user by a submitting party, or asynchronously to the submission of information. The user is able to delete information that is stored by the service on behalf of a submitting party, correct or modify that information, or add information that the user wishes to be known to the submitting party. Indeed, the user may edit, correct and/or delete information regarding the user for any of a plurality of profiles or identities that may be associated with the user.

According to various alternative embodiments, while the service may be configured to store user information for a submitting party, such data may or may not be readily "accessible" to the user, i.e., the subject matter of the data submitted by a submitted party may not be decipherable or accessible by the user. For example, a vendor may submit certain information regarding its own determination of the value of the user, and wants that information to remain private to the vendor. Indeed, such information may also be submitted in encoded format such that it is not legible even if accessed by the user. However, in embodiments where the user may not be able to view or determine the nature or content of the information stored by the service on behalf of a submitting party, the user may still be able to direct the service to delete that information from storage by the service.

Turning to FIG. 1, FIG. 1 is a pictorial diagram illustrating an exemplary network environment 100 suitable for implementing aspects of the disclosed subject matter. As shown in FIG. 1, the exemplary network 100 includes one or more user computing devices (including mobile user computing devices) such as user computing devices 102 and 104, each associated with a computer user, i.e., users 101 and 103 respectively. The user computing devices 102 104 are interconnected by way of a network 108. As those skilled in the art will appreciate, a computer network or data network (referred to as "network" throughout this document by way of shorthand description) is a telecommunications network which allows networked computing devices (computing devices communicatively connected to the network) to exchange data. In computer networks, networked computing devices exchange data with each other along network links (data connections). The connections between nodes are established using either wired and/or wireless connections. While, perhaps, the best-known computer network is the Internet, sometimes also referred to as the "Web," the disclosed subject matter is not limited to operation solely on the Internet.

Also illustrated in the exemplary network environment is a listening device 110 that is configured to receive user broadcasts of identifiers, including dynamic identifiers, to determine the identity of users/persons in the listening area of the listening device. According to aspects of the disclosed subject matter, the listening device 110 is configured to listen to identity broadcasts of user identifiers, including dynamic identifiers, for the purpose of discovery and tracking of people (corresponding to the discovered user computing devices) within the listening area of the listening device. Also, the listening device 110 is also communicatively connected to the internet and, therefore, may be considered a network computing device. As will be described in greater detail below, the listening device 110 communicates with an information service in order to obtain user information regarding a computer user by way of the dynamic identifier broadcast by the computing device corresponding to the computer user. Of course, while the listening device 110 will be described as one that listens, it should be appreciated that the listening device may also broadcast information.

Still further included in the exemplary network environment 100 is computing device 112 that hosts an identification service 114. As will be described in greater detail below, the identification service 114 processes requests for identification information of a target user (by way of a dynamic identifier of the target user) as well as a providing dynamic identifiers to the participating users.

In operation and with regard to the network environment 100 of FIG. 1, the computer user 101 may configure his/her computing device 102 to broadcast a dynamic identifier that was obtained from the identification service 114 over the network 108. Computer user 103, by way of computing device 104, may receive the dynamic identifier of computer user 101. Because the dynamic identifier changes, there is no way for computer user 103 of identifying computer user 101 without the assistance of the information service 114. Thus, upon receipt of the broadcasted dynamic identifier, the user computer 104 generates and submits an identification request to the information service 114. The information service 114, upon receipt of the identification request, determines the actual identify of the target computer user (in this example, computer user 101), determines the scope of access of the requesting computer user to the information of the target computer user, generates an information response, and returns the information response to the requesting computer user (computer user 103) in response to the information request.

While the exemplary network environment 100 has been described in regard to user computing devices 102 and 104, as well as listening device 110 and network computing device 112, it should be appreciated that this is illustrative and should not be construed as limiting upon the disclosed subject matter. Indeed, in various embodiments there may be any number of computing devices and/or other networking devices, including multiple user computing devices individually broadcasting their own dynamic identifier, as well as multiple listening devices and/or other computing devices.

As suggested above, the dynamic identifier is updated according to triggering events such that any given value for the dynamic identifier is associated with the user for a limited period of time. By using dynamic identifies, anyone that would like to know information about a particular target user (i.e., a computer user whose computing device is broadcasting a dynamic identifier) must consult with an information service 114 that determines the scope of information that the requesting user may obtain according to rules established by (or for) the target user with the information service. A more detailed discussion of obtaining information regarding the user is set forth below in regard to FIG. 6. Triggering events may be based on any number of factors, criteria, or context relating to the computer user. The basis of the triggering events may include, by way of illustration and not limitation: passage of a time period, a threshold change in geographic location of the computer user; entry in or exit from a predetermined area, time of day, day of week, holidays, vacations, a calendar/schedule event on the computer user's calendar, a manual request, and the like. A computer user may establish rules for third party access to the user's identification and/or other information based on a particular event or set of events or conditions, as well as for a particular person, group, and the like.

Figure 2:
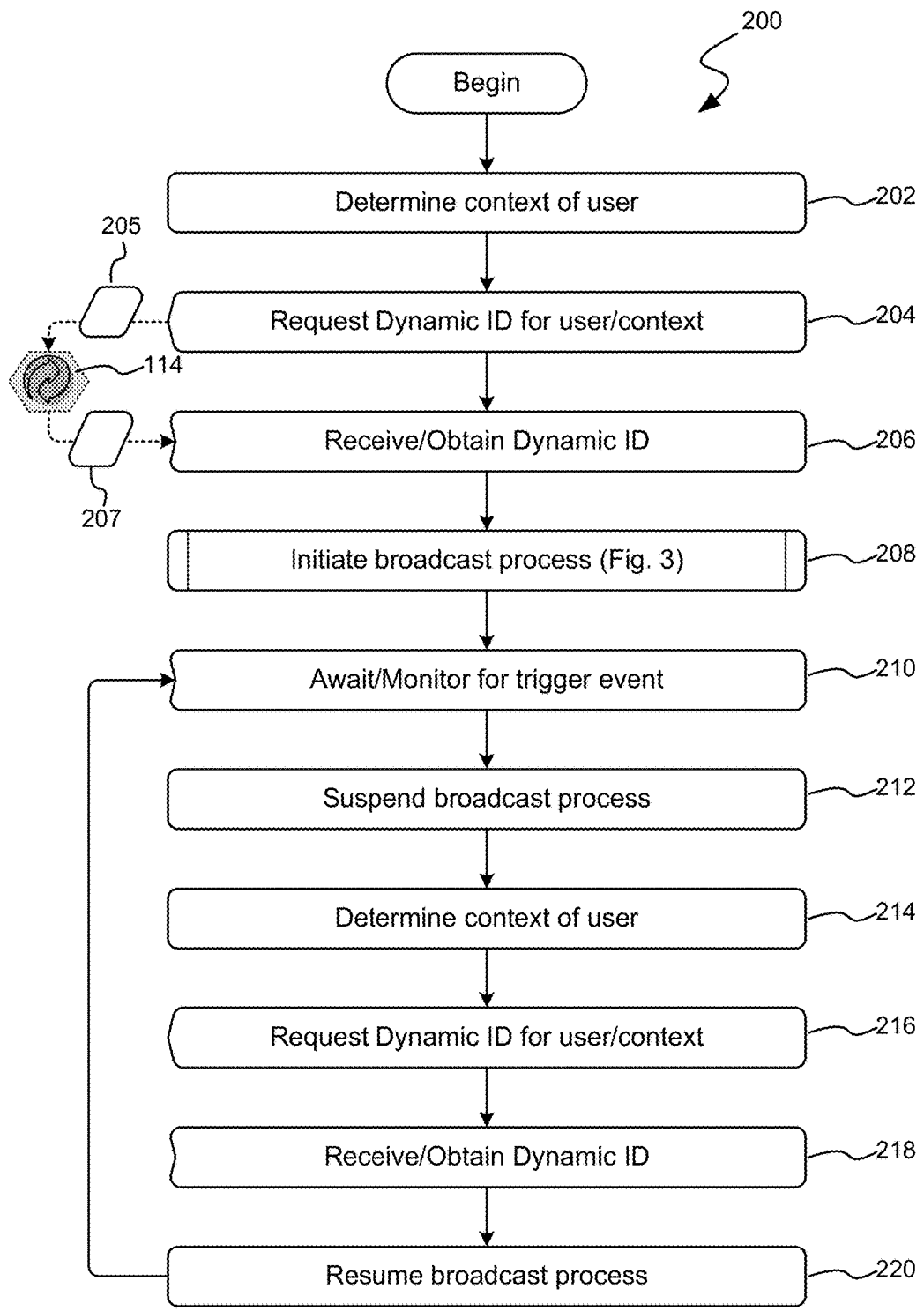
FIG. 2 is a flow diagram illustrating an exemplary routine for broadcasting a dynamic identifier according to aspects of the disclosed subject matter.

FIG. 2 is a flow diagram illustrating an exemplary routine 200, as implemented on a personal computing device, for broadcasting a dynamic identifier, according to aspects of the disclosed subject matter. At block 202, a determination of context of the user is made. This determination may be made according to any number of criteria and/or factors including the current geo-location of the user (as determined by the mobile computing device), calendar/schedule information, current network connection factors (speed/bandwidth, provider, public/private access point, etc.), and the like. Of course, context may also be implied according to date, day of week, holiday, time, and the like. Typically, though not mandatorily, the determination of the context of the user is directed to those criteria and/or factors that are not likely available to an information service 114.

At block 204, a request 205 for a dynamic identifier is submitted to the information service 114. This request 205 typically includes, by way of illustration and not limitation, information identifying the requesting computer user to information service (which may be in the form of a static user identifier), as well as contextual information determined about the user (as determined in block 202). At block 206, a dynamic information response 207 is returned to the user. The dynamic information response includes a dynamic identifier that is associated with the user by the information service 114.

Figure 3:
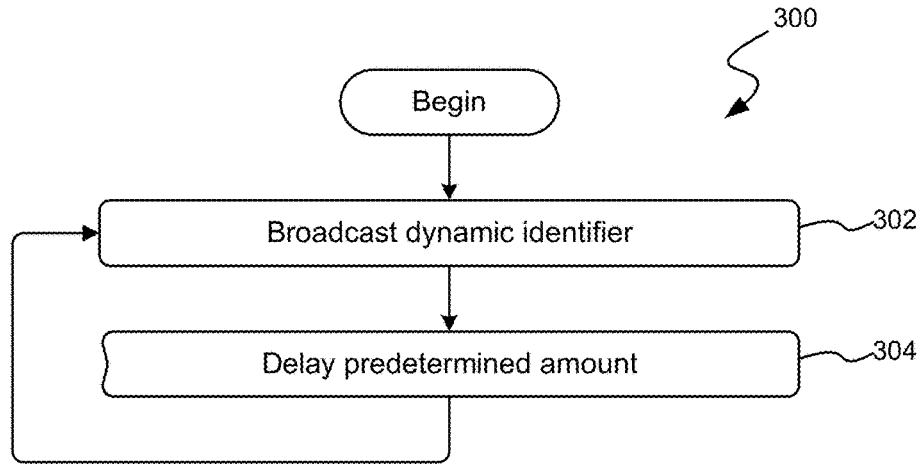
FIG. 3 is a flow diagram illustrating an exemplary broadcast routine configured according to aspects of the disclosed subject matter.

At block 208, the broadcast process that periodically broadcasts the current dynamic identifier of the corresponding computer user is initiated. Regarding the broadcast process, while those skilled in the art will appreciate that initiating the process is straightforward, the process itself is described in regard to FIG. 3. Indeed, FIG. 3 is a flow diagram illustrating an exemplary broadcast routine 300 configured according to aspects of the disclosed subject matter. Beginning at block 302, the current value of the dynamic identifier is broadcast via an RF (radio frequency) signal by hardware and services within the mobile computing device. At block 304, a delay of a predetermined amount of time occurs. Thereafter, the routine 300 returns to block 302 to repeat. Of course, it should be appreciated that during the delay of block 304, or while the process is otherwise suspended, the current value of the dynamic identifier may change.

Returning again to routine 200 of FIG. 2, after having initiated the broadcast process, at block 210 the exemplary routine 200 awaits a triggering event. According to aspects of the disclosed subject matter, a triggering event is a condition that occurs which causes (triggers) the exemplary routine 200 to obtain a new dynamic identifier. Triggering events may include, by way of illustration and not limitation, the passage of a predetermined amount of time, a change to the current geo-location of the user (including a change in location above a predetermined threshold amount, and entry into or exit from a predetermined geographic area), events relating to calendar/schedule information, a change in current network connection factors (speed/bandwidth, provider, public/private access point, etc.), passage of a predetermined amount of time, time of day, date, day of week, holiday, a user-initiated trigger (i.e., the user forces a triggering event to occur), and the like. Each or any of the factors/criteria/conditions may be the basis of a trigger event such that the routine 200 proceeds to block 212.

At block 212, because the current value of the dynamic identifier will be changing, the broadcast process may optionally suspended. At block 214, in similar manner to that described above in regard to block 202, a determination of the current context of the user is made. At block 216, a request for a dynamic identifier is submitted to the information service 114 and, at block 218, a new dynamic identifier corresponding to the computer user is received. At block 220, if the broadcast process was suspended it is resumed, now broadcasting the new dynamic identifier corresponding to the user. Thereafter, the routine 200 returns to block 210 to await another triggering event.

With regard to routine 200, while no particular "end" of the routine is described, terminating this routine may be controlled by another process, manually terminated by the user, or as part of a shut-down procedure of the mobile computing device upon which it is running. However, generally speaking the routine 200 will typically continuously run while the mobile computing device is in operation.

Figure 4:
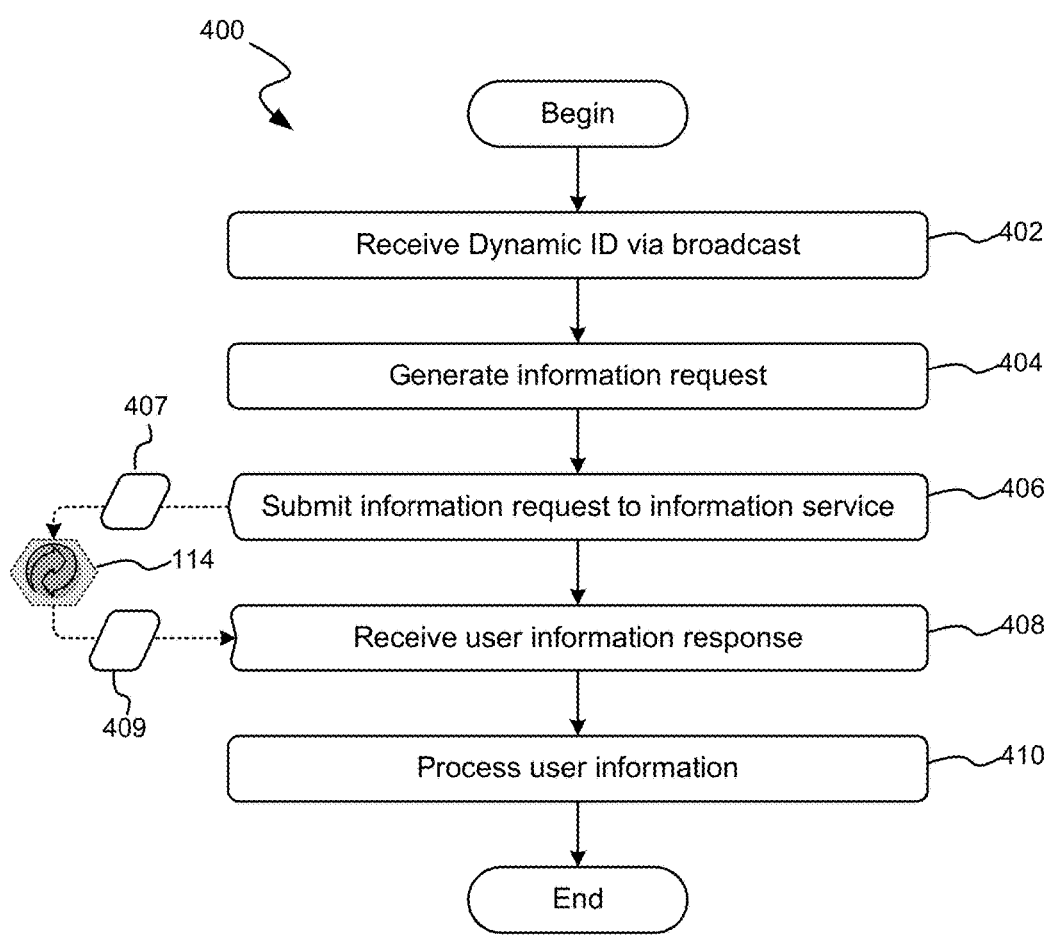
FIG. 4 is a flow diagram illustrating an exemplary routine for determining identification information regarding a target user according to a dynamic identifier of the target user.

Turning now to FIG. 4, FIG. 4 is a flow diagram illustrating an exemplary routine 400 for determining identification information regarding a target user according to a dynamic identifier of the target user as implemented on a computing device, such as computing device 104 of FIG. 1. Beginning at block 402, a dynamic identifier regarding a target user is received. As suggested above, the target user (such as computer user 101 in conjunction with mobile computing device 102) will broadcast a dynamic identifier that others may receive and, if desired, can query an information service 114 to determine additional information regarding the corresponding target user in accordance with rules and/or permissions established by (or on behalf of) the target user.

At block 404, an information request, e.g., information request 407, based on the received dynamic identifier is generated. Typically, though not mandatorily, the information request will include the identification of the requesting computer user. According to additional aspects of the disclosed subject matter and by way of illustration and not limitation, the identification of the requesting computer user may comprise a persistent identification value known to (or assigned by) the information service 114 such that the information service may be readily able to identify the purpose or motivation behind an information request. For example, a commercial establishment may be associated with a known identifier such that the information requests submitted by the commercial establishment will readily indicate to the intent (i.e., to obtain information regarding the person/user for purposes of providing sales and/or offers to the person) of the establishment. Alternatively or additionally, the information request may include intent request information. By way of illustration and not limitation, intent request information may include an indication of making offers to the person, of determining whether the person is part of a rewards or loyalty program of the commercial establishment. Alternatively, the intent request information may indicate that a receiving party is querying whether the dynamic identifier corresponds to a colleague or associate.

At block 406, the information request 407 is submitted to the information service 114. At block 408, in response to the information request 407, an information response 409 is received from the information service 114. The information response 409 includes the information that is available to the requesting user per the rules/permissions associated with the target user. Thereafter, at block 410, the obtained user information regarding the target user is (or may be) processed according to the purposes of the computer user initiating the information request 407. Thereafter, the routine 400 terminates.

Figure 5:
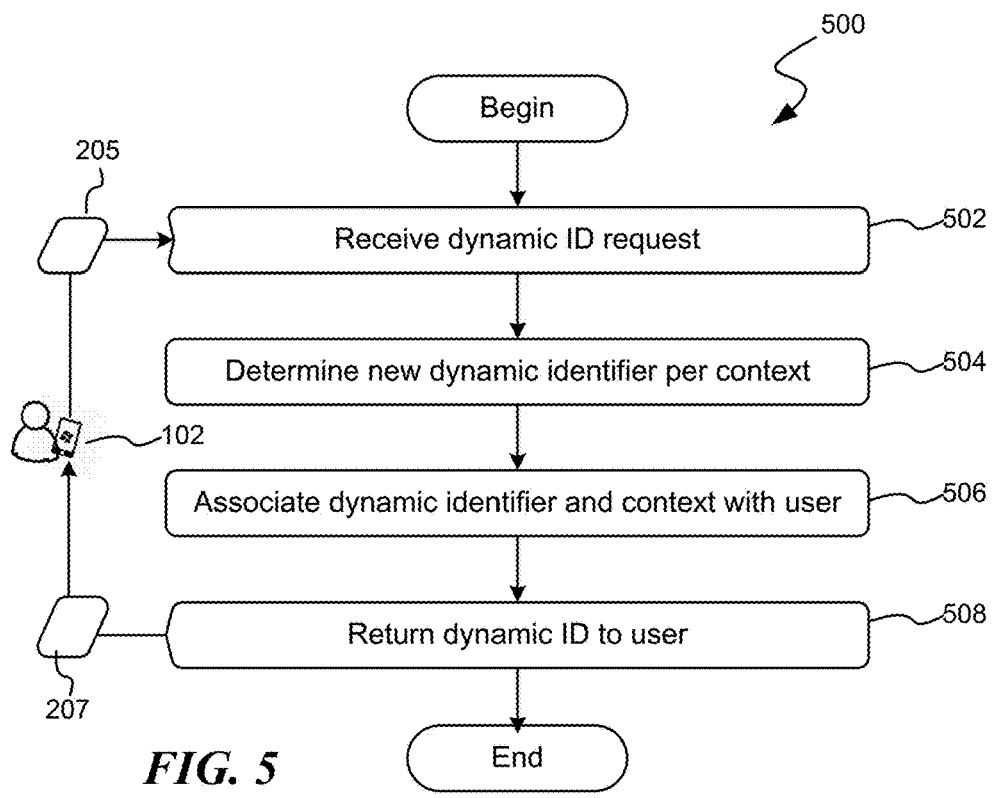
FIG. 5 is a flow diagram illustrating an exemplary routine for providing a new dynamic identifier for a computer user according to aspects of the disclosed subject matter.

FIG. 5 is a flow diagram illustrating an exemplary routine 500 for providing a new dynamic identifier for a computer user according to aspects of the disclosed subject matter. Beginning at block 502, a dynamic identifier request, such as request 205, is received from a computer user (via the computer user's mobile computing device.) At block 504, a new dynamic identifier corresponding to the user is determined. According to aspects of the disclosed subject matter, the dynamic identifier may be determined according to the current contextual factors corresponding to the user, including those factors provided by the requesting computer user. By way of a non-limiting example, the dynamic identifier may be generated to reflect the current geographic location of the computer user in such a manner such that if the computer user (as determined by the computer user's mobile computing device) is in a public location, a dynamic identifier is generated. The dynamic identifier may be an encrypted value or otherwise encoded value that is accessible (i.e., can be deciphered) only to the service issuing the identifier. Indeed, according to aspects of the disclosed subject matter, the dynamic identifier of a person is intended to be opaque to others except the service (such as information service 114) that originates the identifier on behalf of a person/user. In this example and according to rules/preferences set for the corresponding user, third parties that receive the dynamic identifier may be provided (through a request to the information service) that set of information regarding the corresponding computer user identified as is accessible to the third parties in such circumstances.

According to aspects of the disclosed subject matter, rules and preferences associated with a given computer user may restrict access to third parties of elements of a user's information according to context factors/criteria as well as the identity of a requesting third party. These factors/criteria may include, by way of illustration and not limitation, personal preferences (e.g., email accounts, group memberships, etc.), access criteria of the user established with third parties (e.g., access of friends, family members, etc., from social networking services, or access controls of an employer), reward and/or club member programs, the types of credit cards that the user holds, and the like. For example, assuming a dynamic identifier based on context information that includes within a public location, a computer user may indicate that family members may obtain substantially more information regarding the computer user, including the actual identity of the computer user, than other third parties not know to the computer user. Alternatively, the computer user may indicate that while the computer user is within a particular geographic area, a very limited set of information regarding the user is accessible to third parties, irrespective of whether or not any requesting third party is a family member. Indeed, through the use of the current context of the computer user and established rules and preferences, the computer user is provided with total control of distribution of personal information, including control over the actual identity of the computer user.

After determining a new dynamic identifier for the requesting computer user, where the dynamic identifier is based on contextual information (if any) provided by the user as well as the rules/preferences established by the computer user, at block 506 the dynamic identifier and the current context are associated with the user such that, upon receipt of a request regarding a particular dynamic identifier, the information service 114 is able to readily translate the dynamic identifier to a particular user. Thereafter, at block 508 a dynamic information response, such as dynamic information response 207, is returned to the requesting computer user, where the dynamic information response includes a new dynamic identifier for the computer user. Thereafter, the routine 500 terminates.

Figure 6:
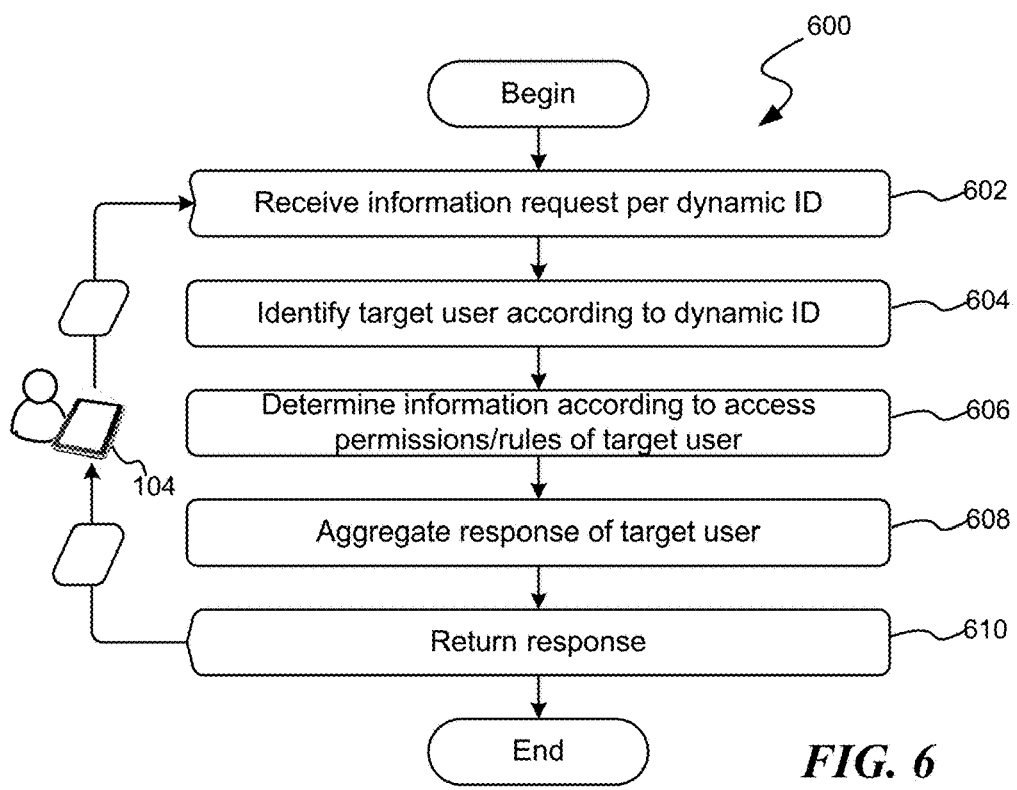
FIG. 6 is a flow diagram illustrating an exemplary routine for responding to an information request regarding a target user according to aspects of the disclosed subject matter.

While routine 500 of FIG. 5 is directed to providing an updated/new dynamic identifier to a participating user, FIG. 6 is a flow diagram illustrating an exemplary routine 600 for responding to an information request regarding a target user, as implemented by an information service 114 configured according to aspects of the disclosed subject matter. Beginning at block 602, an information request, such as information request 407 discussed in regard to routine 400 of FIG. 4, is received from a computer user in regard to a target user, i.e., a computer user whose computing device is broadcasting a dynamic identifier. At block 604, the information service 114 identifies the target user by way of the dynamic identifier. At block 606, an evaluation of the current context of target user and the identity (if any) of the requesting computer user (such as computer user 103) as may be identified in the information request 407 in light of the rules and/or permissions that have been established with regard to the target user is conducted to determine what information (if any) of the target user can be provided to the requesting computer user. By way of illustration and not limitation and as described above, access permissions may be made according to third party sources (e.g., social networking privileges), based on prior established relationships (e.g., reward membership enrollment, previous purchases from a vendor, preferences with regard to a particular category of items, etc.), and the like. For example, upon determining that the requesting user is requesting information regarding the target user (via the dynamic identifier of the target user), a determination that the two are associates, colleagues, or family members can influence the type of information that is accessible to the requesting user. Alternatively, if the target user has indicated a context that he/she wishes to remain anonymous, prior relationships or third party permissions may be overridden due to the context established with regard to the user. Indeed, according to aspects of the disclosed subject matter, the ability to control the distribution of information of a target user through the use of a dynamic identifier/identification service is highly configurable, providing each user with fine control (if desired) over dissemination of the user's information.

At block 608, information regarding the target user that is accessible to the target user is aggregated into an information response, such as information response 409, and at block 610, the information response is returned to the requesting computer user. Thereafter, the routine 600 terminates.

Regarding routines 200-600 described above, as well as other processes describe herein such as routines 1000-1200 described below, while these routines/processes are expressed in regard to discrete steps, these steps should be viewed as being logical in nature and may or may not correspond to any specific actual and/or discrete steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines/processes are typically embodied within executable code modules comprising routines, functions, looping structures, selectors and switches such as if-then and if-then-else statements, assignments, arithmetic computations, and the like. However, as suggested above, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer readable media expressly excludes carrier waves and/or propagated signals.

Figure 7:
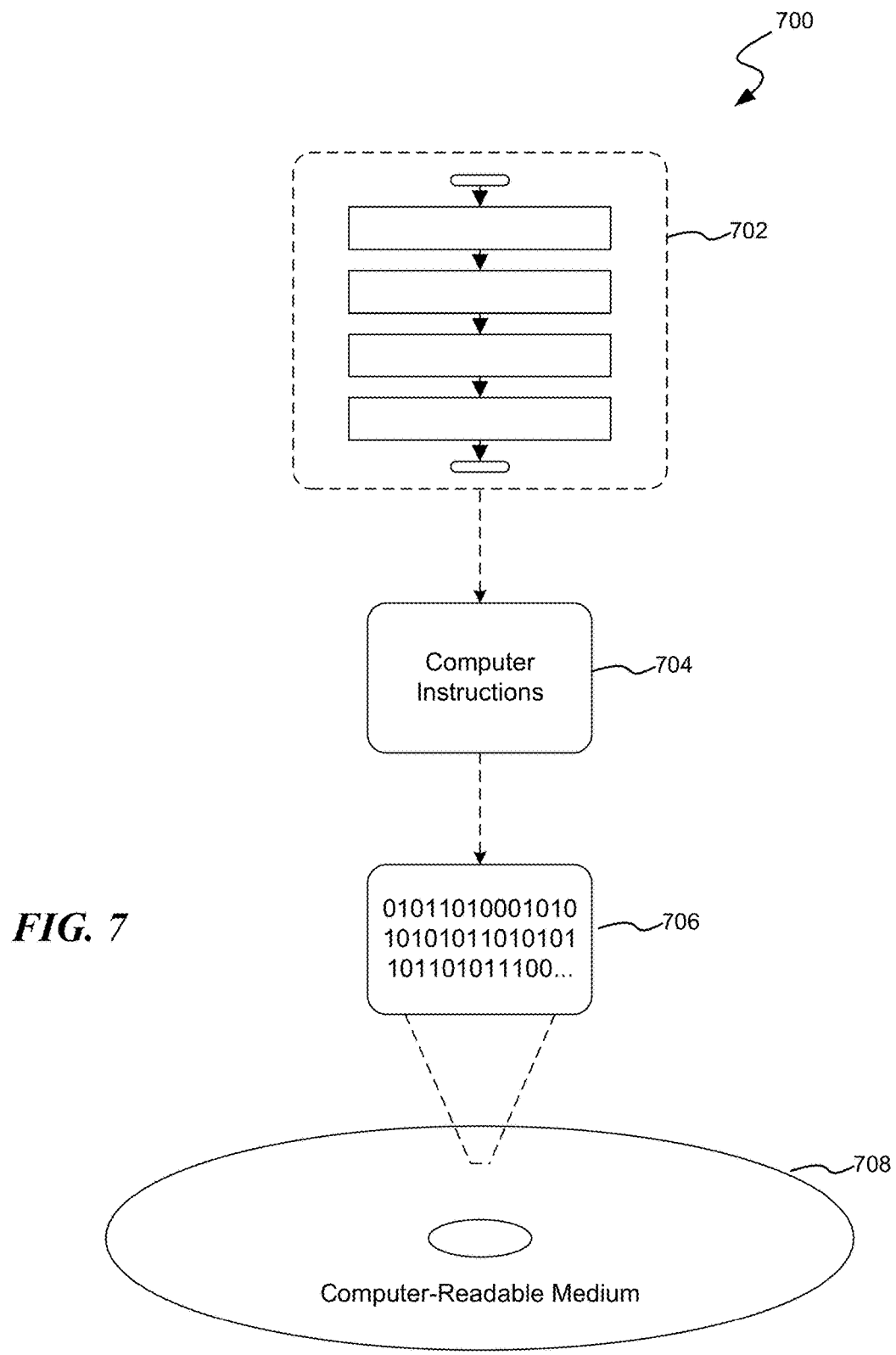
FIG. 7 is a block diagram illustrating exemplary computer-readable media configured according to aspects of the disclosed subject matter.

Turning to FIG. 7, FIG. 7 is a block diagram illustrating an exemplary computer readable medium encoded with instructions to generate metadata in regard to an image, respond to an image request with the image and metadata, and/or request an image from an online image service as described above. More particularly, the implementation 700 comprises a computer-readable medium 708 (e.g., a CD-R, DVD-R or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary methods 200-600 of 1000, for example. In another such embodiment, the processor-executable instructions 704 may be configured to implement a system, such as at least some of the exemplary systems 800 or 900, as described below. Many such computer-readable media may be devised, by those of ordinary skill in the art, which are configured to operate in accordance with the techniques presented herein.

Figure 8:
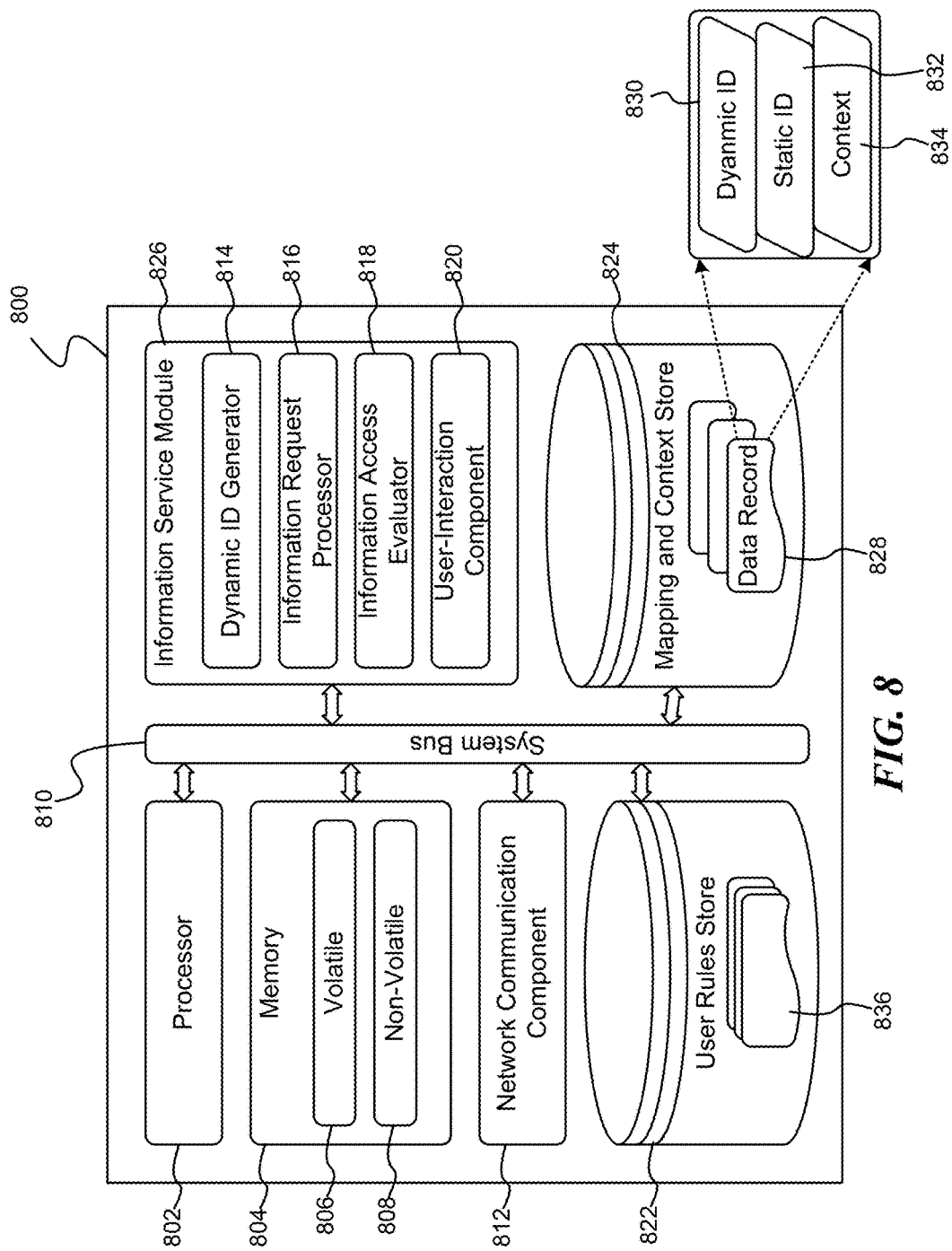
FIG. 8 is a block diagram illustrating an exemplary computing device configured to provide an information service for controlling the distribution of information regarding a target user according to a dynamic identifier associated with the target user.

Turning now to FIG. 8, FIG. 8 is a block diagram illustrating an exemplary computing device 800 configured to provide an information service 114 for controlling the distribution of information regarding a target user according to a dynamic identifier associated with the target user. The exemplary computing device 800 includes one or more processors (or processing units), such as processor 802, and a memory 804. The processor 802 and memory 804, as well as other components, are interconnected by way of a system bus 810. The memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. Generally speaking, RAM and CPU cache memory are examples of volatile memory 806 whereas ROM, solid-state memory devices, memory storage devices, and/or memory cards are examples of non-volatile memory 808.

As will be appreciated by those skilled in the art, the processor 802 executes instructions retrieved from the memory 804 (and/or from computer-readable media, such as computer-readable media 700 of FIG. 7) in carrying out various functions of an information service 114 as set forth above. The processor 802 may be comprised of any of a number of available processors such as single-processor, multi-processor, single-core units, and multi-core units.

Further still, the illustrated computing device 800 includes a network communication component 812 for interconnecting this computing device with other devices and/or services over a computer network, including other user devices, such as user computing devices 102 or 104 of FIG. 1. The network communication component 812, sometimes referred to as a network interface card or NIC, communicates over a network (such as network 108) using one or more communication protocols via a physical/tangible (e.g., wired, optical, etc.) connection, a wireless connection, or both. As will be readily appreciated by those skilled in the art, a network communication component, such as network communication component 812, is typically comprised of hardware and/or firmware components (and may also include or comprise executable software components) that transmit and receive digital and/or analog signals over a transmission medium (i.e., the network.)

The exemplary computing device 800 further includes an Information Service Module 826 which, in execution, carries out the functions described above in regard to the information service 114. As shown in FIG. 8, the Information Service Module 826 comprises a Dynamic ID Generator 814. In execution/operation, the Dynamic ID Generator 814 is able to generate a dynamic identifier for a participating/subscribing user in response to a dynamic identifier request 205, or in response to a triggering event detected by the information service 114 (e.g., the passage of a particular amount of time, detection of movement by the participating computer user, etc.) As discussed above, the Dynamic ID Generator 814 generates dynamic identifiers according to the context of a target computer user.

In addition to the Dynamic ID Generator 814, the Information Service Module 826 is shown as also comprising an Information Request Processor 816. In execution/operation, the Information Request Processor 816 processes information requests, such as information request 405 of FIG. 4, in conjunction with an Information Access Evaluator 818, from requesting computer users in regard to information regarding a participating computer user, and provides an information response 407 according to the information accessible to the requesting user. In execution/operation, the Information Access Evaluator 818 determines the information regarding the target user that is accessible to the requesting computer user based on the current context of the target computer user, the identity of the requesting computer user, and in light of the rules and/or preferences established for the target computer user for third party access to the target user's information. Based on the information determined by the Information Access Evaluator 818 to be accessible to the requesting computer user, the Information Request Processor 816 generates an information response (such as information response 407) in response to an information request and returns it (on behalf of the Information Service Module 826) to the requesting computer user.

The Information Service Module 826 is further shown as including a User Interaction Component 820. In execution/operation, the User Interaction Component 820 is configured to provide the user interfaces, APIs (application processing interfaces), and/or functionality that enables each participating computer user of the information service 114 to establish rules and/or preferences with regard to third-party access to the computer user's information, as well as establishing that information.

While the Dynamic ID Generator 814, the Information Request Processor 816, the Information Access Evaluator 818, and the User Interaction Component 820 are illustrated in FIG. 8 as being included as sub-components of the Information Service Module 826, it should be appreciated this is illustrative and not limiting upon the disclosed subject matter. In various configurations and/or embodiments, these components may be implemented as independent but cooperative components of a suitably configured computing device, particularly one that implements an information service 114 as described above.

The exemplary computing device 800 further includes a Mapping and Context Store 824 and a User Rules Store 822. The User Mapping and Context Data Store 824 comprises data records, such as data record 828, for each the participating users of the information service 114. Each data record is comprised at least of information for mapping/translating a dynamic user identifier to a static user identifier (i.e., a user identifier that static and that the information service 114 uses as an identifier for the corresponding computer user, the data record including, at least, a current dynamic identifier 830, a corresponding static identifier 832, and a context record 834 for current context data.

In regard to the User Rules Store 822, this data store comprises records for each of the participating users, each record (such as record 836) comprising a set of rules and/or preferences established for the corresponding user for third party access to the corresponding user's information. Of course, while the User Rules Store 822 and the User Mapping and Context Data Store 824 as shown in FIG. 8 as separate data stores, in various embodiments, the information that they include may be stored as a single data store, or further broken down into more than two data stores, including third party data stores accessible via API interactions. Accordingly, the embodiment disclosed in FIG. 8 should be viewed as illustrative of and not limiting upon the disclosed subject matter.

Figure 9:
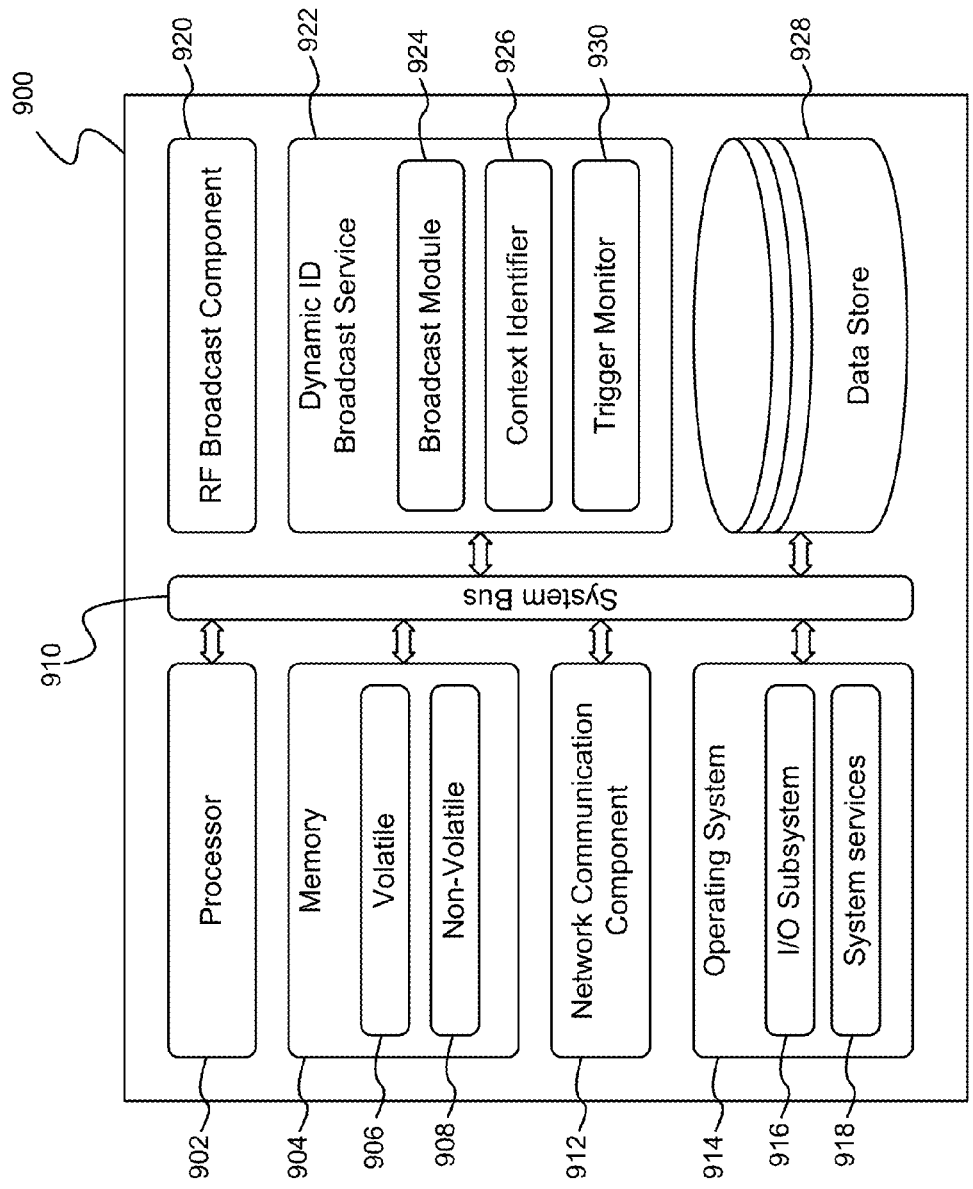
FIG. 9 is a block diagram illustrating an exemplary user computing device configured to broadcast a dynamic identifier in accordance with aspects of the disclosed subject matter.

Turning now to the user computer side, FIG. 9 is a block diagram illustrating an exemplary user computing device 900 configured to broadcast a dynamic identifier in accordance with aspects of the disclosed subject matter. Illustrative, but non-limiting examples of a computing device 900 configured to broadcast a dynamic identifier in accordance with aspects of the disclosed subject matter include a tablet computer, a laptop computer, a mobile phone, wearable computing devices, the so-called phablet computers (i.e., hybrid mobile phone/tablet computing devices), and the like. Of course, more traditional computing devices such as personal computers may also be configured in a similar manner and enjoy many, if not all of the benefits of the disclosed subject matter when configured to broadcast a dynamic identifier.

As with the exemplary computing device 800 of FIG. 8, the exemplary computing device 900 includes one or more processors (or processing units), such as processor 902, and a memory 904. The processor 902 and memory 904, as well as other components, are interconnected by way of a system bus 810. The memory 904 typically (but not always) comprises both volatile memory 906 and non-volatile memory 908.

The processor 902 executes instructions retrieved from the memory 904 (and/or from computer-readable media, such as computer-readable media 700 of FIG. 7) in carrying out various functions of a user computing device, including broadcasting a dynamic identifier as described above. The processor 902 may be comprised of any of a number of available processors such as single-processor, multi-processor, single-core units, and multi-core units.

Further still, the illustrated user computing device 900 includes a network communication component 912 for interconnecting this computing device with other devices and/or services over a computer network, including the information service 114 of FIG. 1. The network communication component 912, sometimes referred to as a network interface card or NIC, communicates over a network (such as network 108) using one or more communication protocols via a physical/tangible (e.g., wired, optical, etc.) connection, a wireless connection, or both. As will be readily appreciated by those skilled in the art, a network communication component, such as network communication component 912, is typically comprised of hardware and/or firmware components (and may also include or comprise executable software components) that transmit and receive digital and/or analog signals over a transmission medium (i.e., the network.)

The exemplary user computing device 900 also includes an operating system 914 that provides functionality and services on the user computing device. These services include an I/O subsystem 916 that comprises a set of hardware, software, and/or firmware components that enable or facilitate inter-communication between a user of the computing device 900 and the processing system of the computing device 900. Indeed, via the I/O subsystem 914 a computer operator may provide input via one or more input channels such as, by way of illustration and not limitation, touch screen/haptic input devices, buttons, pointing devices, audio input, optical input, accelerometers, and the like. Output or presentation of information may be made by way of one or more of display screens (that may or may not be touch-sensitive), speakers, haptic feedback, and the like. As will be readily appreciated, the interaction between the computer user and the computing device 900 is enabled via the I/O subsystem 914 of the user computing device. Additionally, system services 918 provide additional functionality including location services, timers, interfaces with other system components such as the network communication component 912, and the like.

Also included in the exemplary user computing device 900 is an RF Broadcasting Component 920. The RF Broadcasting Component 920 is comprised of hardware (such as an RF antennae—not shown), system drivers, and/or executable code that enables the exemplary computing device to broadcast (and also receive) data over RF (radio frequency) signals, including broadcasting a dynamic identifier corresponding to the computer user.

Still further included in the exemplary user computing device 900 is a Dynamic Broadcast Service 922. The Dynamic ID Broadcast Service 922 is that service that, in execution and/or operation, manages the broadcast of the computer user's dynamic identifier, detects all or some triggering events that trigger a change in the dynamic identifier, communicate with the information service 114 to obtain a new dynamic identifier, and the like. As shown (illustratively) in FIG. 9, the Dynamic ID Broadcast Service 922 includes a Broadcast Module 924 that, in execution and/or operation, broadcasts the current dynamic identifier of the computer user by way of the RF Broadcast Component 920, as well as a Context Identifier 926 that, in execution and/or operation, determines current contextual information relating to the computer user (as determined by the computer user's user computing device 900) for submission to the information service 114 as part of a request for an updated/new dynamic identifier. Further still, the exemplary user computing device 900 may include a data store 928 into which contextual information, rules, dynamic identifier values, and the like may be stored. While shown as separate from the memory 904, in various embodiments the data store 928 may be included as part of the memory.

A Trigger Monitor component 930 is used to monitor for triggering events on the exemplary user computing device 900. As indicated above, triggering events may include, by way of illustration and not limitation: the passage of a time period, a threshold change in geographic location of the computer user; entry into or exit from a predetermined area, time of day, day of week, holidays, vacations, a calendar/schedule event on the computer user's calendar, a manual request, and the like. As indicted above, upon the occurrence of triggering event, a new current dynamic identifier is obtained for broadcast.

While not shown, the Dynamic ID Broadcast Service 922 may also include one or more modules that, in execution and/or operation, operate to independently determine a new value for the dynamic identifier. Indeed, rather that always requesting a new dynamic identifier from the information service 114, any of algorithms, routines, executable code modules and the like may be provided to the Dynamic ID Broadcast Service 922 such that upon detecting a triggering event, the Dynamic ID Broadcast Service may determine a new value for the dynamic identifier. In such embodiments, the Dynamic ID Broadcast Service 922 would likely continue to communicate with the information service 114 in order to inform the information service 114 of a new dynamic identifier and context.

While the Dynamic ID Broadcast Service 922 is shown as including various components (sub-components), including the Broadcast Module 924 and the Context Identified 926, this configuration should be viewed as illustrative and not limiting upon the disclosed subject matter. In various, alternative embodiments, the Dynamic ID Broadcast Service 922, the Broadcast Module 924, the Trigger Monitor component 930 and the Context Identified 926 may be implemented as independent but cooperative modules on the user computing device 900.

Regarding the various components of the exemplary computing devices 800 and 900, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

Moreover, in certain embodiments each of the various components of the exemplary computing devices 800 and 900 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network, such as network 108 of FIG. 1.

Figure 10:
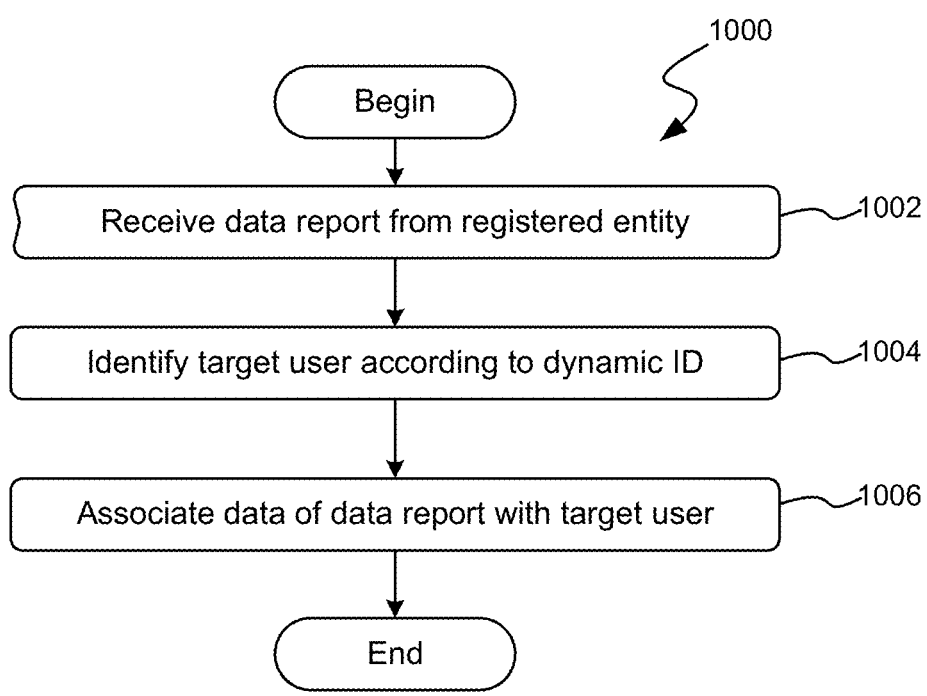
FIG. 10 is a flow diagram illustrating an exemplary routine for a registered entity to track information regarding a target user via a dynamic identifier.

As discussed above, through the use of dynamic identifiers, a particular user is provided with control over what information may be disseminated to others, such as vendors, organizations, venues, and the like. Of course, this makes it impossible for any entity, such as a vendor, to keep track of information regarding a target user without permission from the target user and support of the identification service 114. This support takes the form of the identification service 114 maintaining information of target users on behalf of registered entities (entities that are registered with the identification service for the purpose of maintaining information regarding one or more target users). FIG. 10 is a flow diagram illustrating an exemplary routine 1000 for a registered entity to track information regarding a target user via a dynamic identifier.

By way of illustration, assume that a target user enters a department store, where the department store is a registered entity with the identification service 114. The department store obtain a dynamic identifier regarding the user and after a query to the identification service 114, receives no information back (according to the rules/permissions established for the target user.) However, the department store can track the target user within the store's confines and determines that the target user spends a significant amount of time looking at men's jeans. While the department store does not know who the target user is, since the target user's identity is masked by the dynamic identifier, because the department store is a registered entity, it may make a data report to the identification service 114 indicating that the target user, as determined by the dynamic identifier of the target user, has spent time browsing the men's jeans, which is stored by the identification service on behalf of the registered entity (the department store) in regard to the target user.

Assume, further, that the target user returns at a later date to the same department store. Due to the use of dynamic identifiers, the department store is not able to "identify" the target user by way of an information request. However, because the department store associated data with the target user with the information service 114, even though the identity of the target user may be hidden from the department store, information regarding prior visits to the department store may be provided back to the department store in response to the information request (per block 606 of routine 600.) Of course, this information that is returned to the department store is provided according to rules and/or permissions established on behalf of the target user. Assuming that the target user has granted permission, the information that this target user previously was browsing men's jeans may be returned to the department store in the information request thereby giving the department store an opportunity to create a targeted offer to the target user without disclosing anything outside of the scope permitted by the rules and permissions established for the target user. Of course, the target user is provided with control over all information of the target user that is/may be disseminated to others, and in this example may exclude the department store from gathering information and/or edit what information is tracked by the department store.

Turning, then, to FIG. 10, at block 1002 the identification service 114 receives a data report from a registered entity. The data report from the registered entity includes at least data to be associated with a target user and the dynamic identifier of the target user. Also, the data report will include or otherwise identify the registered entity to the identification service 114. At block 1004, the identification service 114 identifies the target user (typically, but not exclusively, a static identifier associated with the target user) by way of the dynamic identifier. Based on rules and/or permissions established by the target user, the data of the data report is stored and associated with the target user. As mentioned above, this information/data becomes available (if at all) to the registered entity by way of an identification request as discussed above in regard to block 606 in FIG. 6. Thereafter, the routine 1000 terminates.

As indicated above, there are many entities that will wish to maintain data regarding a particular user. For example, a vendor may wish to maintain information regarding preferences of a user/customer. The vendor may obtain information of the user according to a dynamic identifier and wish to keep that information. Of course, without the information service 114 to correlate a dynamic identifier to a user, it would be impossible to keep such information. Rather than allowing the vendor to maintain user information, the information service 114 provides a means by which the vendor can submit user information that it has aggregated regarding a user and submit it to the information service 114 for storage on behalf of the vendor. In turn, the information service 114 can be configured to provide the user with the ability to establish rules with regard to what information is stored, and/or provide the ability for a user to modify (including update, edit, correct, delete, and augment) user information that the information service 114 is storing about the user on behalf of the submitting party (e.g., a vendor.)

Figure 11:
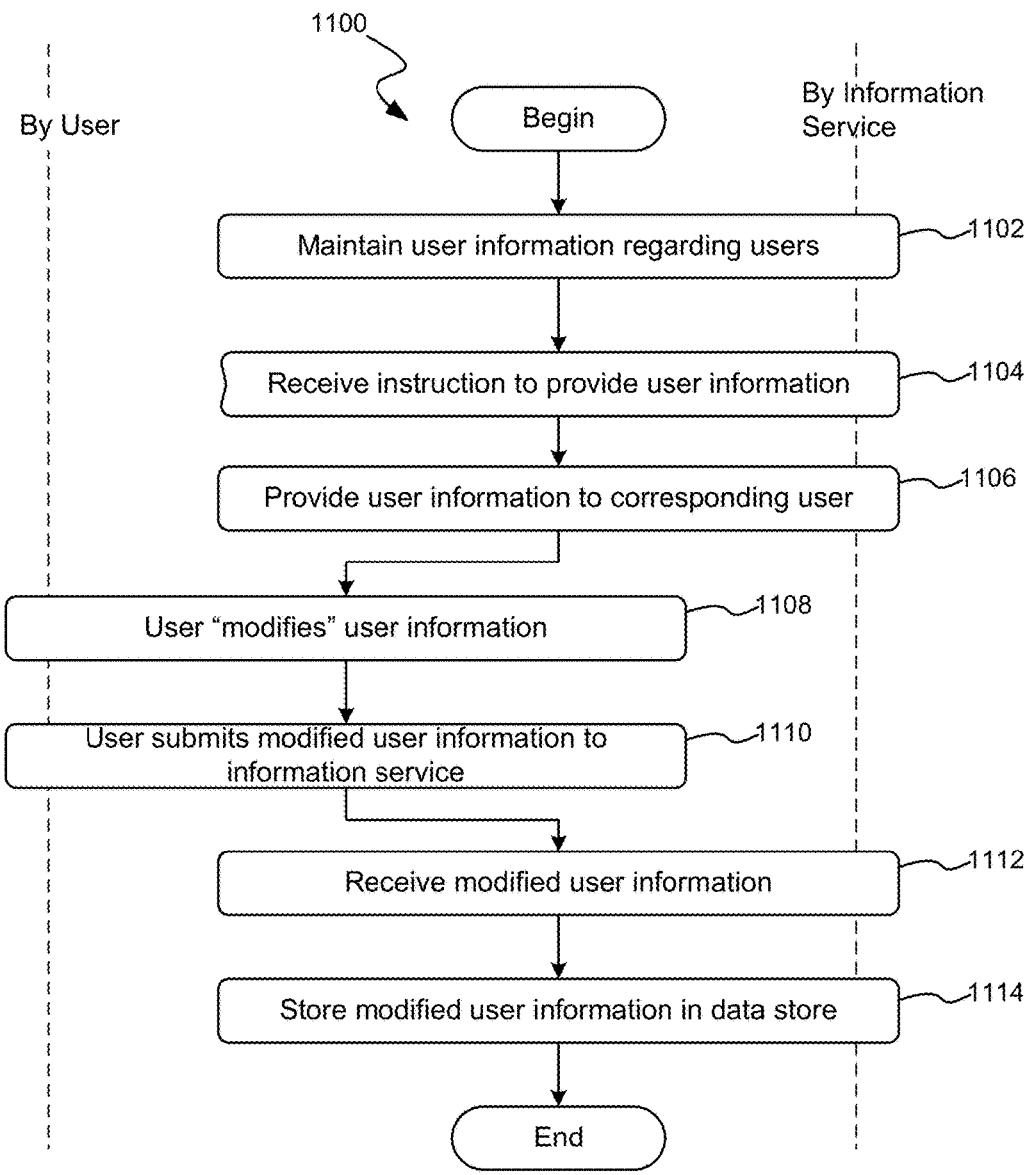
FIG. 11 is a block diagram illustrating an exemplary routine for enabling a user to modify user information stored or maintained by the information service about the user on behalf of a submitting party.

FIG. 11 is a block diagram illustrating an exemplary routine 1100 for enabling a user to modify user information stored or maintained by the information service 114 about the user on behalf of a submitting party. At block 1102, user information regarding a plurality of users is maintained in a data store, such as User Rules Store 822 of FIG. 8. At block 1104 an instruction is received by the information service 114 to modify user information about the user. By way of illustration and not limitation, the instruction may be generated by the user for which the information is (or is to be) maintained. Alternatively, the instruction may be generated according to one or more rules established with the information service 114 by the user with regard to storing/maintaining user information on behalf of a submitting party. Still further, the instruction may be generated automatically upon submission of user information to the information service 114 by a submitting party.

At block 1106, user information is provided to the user for verification and/or modification. According to aspects of the disclosed subject matter, the user information provided to the user may correspond to a one of a plurality of user profiles/contexts of the user, or to a single set of user information for that user as maintained (or to be maintained) by the information service 114 on behalf of a submitting party.

At block 1108, the user makes one or more modifications to the user data. According to the disclosed subject matter, a modification to user information may include deleting all or some of the user information, modifying or editing some or all of the user information, adding additional user information to that provided by the information service 114, and the like. Additionally, the user may choose to allow the user information to be stored by the information service on behalf of the submitting party. Further still, if the user fails to respond to the presentation of information, as a default the information service 114 may take various actions on behalf of the user, such as marking the user information as pending review of the user.

At block 1110, the modified user information is submitted to the information service for storage on behalf of the submitting party. At block 1112, the modified user information is received by the information service 114 and at block 1114 the modified user information is stored for the user. By way of illustration and example, this information may be stored with user's rules and profiles in the User Rules Store 822. Thereafter, the routine 1100 terminates. Of course, once the modified user information has been stored, when the submitting party subsequently requests information regarding the user by way of a dynamic identifier, and assuming that the current context allows such information, the information service 114 will return at least some of the stored user information to the submitting/requesting party.

Figure 12:
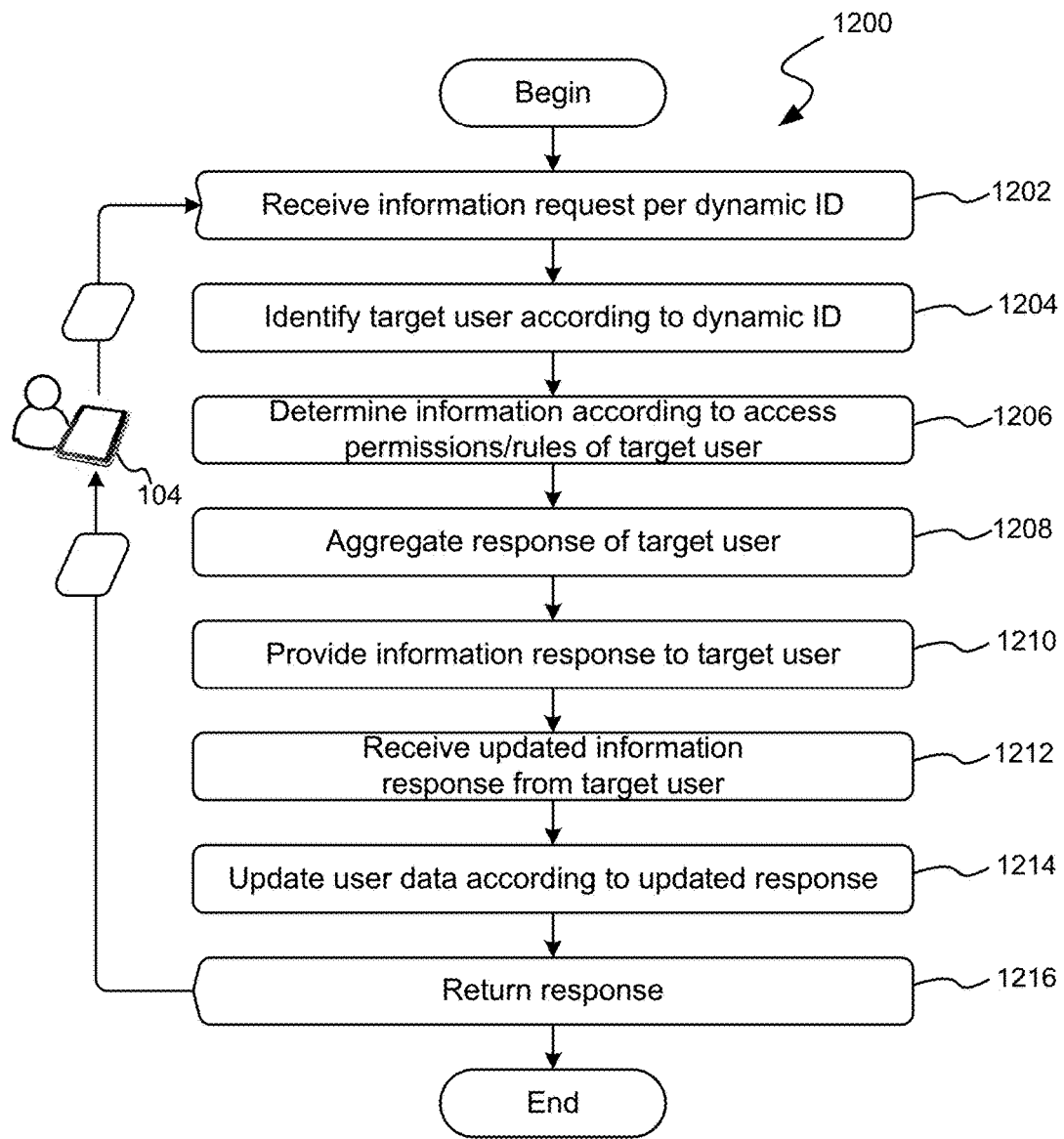
FIG. 12 is a flow diagram illustrating an exemplary routine for responding to an information request regarding a target user according to additional aspects of the disclosed subject matter.

While FIG. 6 describes a routine 600 for responding to an information request regarding a target user that does not require synchronous target user input, in many instances it may be advantageous to involve the target user when the identity of the target user is requested. An example may be when a business is requesting information regarding the target user. Indeed, continuing the example of above, a target user may not wish for the business to aggregate information, even that the user was looking at men's jeans. Regarding routine 600, while it does not exclude the involvement of the target user in regard to an information response, it does not specifically recite such subject matter. Accordingly, FIG. 12 is a flow diagram illustrating an exemplary routine 1200 for responding to an information request regarding a target user according to additional aspects of the disclosed subject matter.

Beginning at block 1202, an information request, such as information request 407 discussed in regard to routine 400 of FIG. 4, is received from a requesting entity in regard to a target user, i.e., a computer user whose computing device is broadcasting a dynamic identifier. At block 1204, the information service 114 identifies the target user by way of the dynamic identifier. At block 1206, an evaluation of the current context of target user and the identity (if any) of the requesting computer user (such as computer user 103) as may be identified in the information request 407 in light of the rules and/or permissions that have been established with regard to the target user is conducted to determine what information (if any) of the target user can be provided to the requesting computer user.

At block 1208, information regarding the target user that is accessible to the target user is aggregated into an information response, such as information response 409. At block 1210, the information request is confirmed with the target user. Typically, but not exclusively, this involves providing the information of the information response to the target user for confirmation, editing, deletions, etc. At block 1212, an updated information response is received from the target user. This updated information response may be a copy of the originally aggregated information response, but alternatively may include edits, deletions, and the like, as provided by the target user. At block 1214, the updated information response may be used to update the user data maintained on behalf of the requesting entity. For example, if the target user deletes information from the information response, that same information may be deleted from the aggregated information maintained for the requesting entity about the target user. At block 1216, the updated information response is returned to the requesting entity. Thereafter, the routine 1200 terminates While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for managing user information regarding a first user, the method comprising each of the following as implemented by an identification service:
   maintaining a data store of the identification service that stores user information regarding a plurality of computer users on behalf of submitting parties;
   receiving, by the identification service, the user information regarding the first user included in the plurality of computer users from a second user, the second user distinct from the first user, wherein the user information is received by the identification service in conjunction with a current dynamic user identifier associated with the first user;
   mapping, by the identification service, the current dynamic user identifier received in conjunction with the user information with a static user identifier to identify the first user;
   storing, by the identification service, the user information in the data store on behalf of the second user in association with the static user identifier associated with the first user;
   presenting, by the identification service, the user information received from the second user to the first user and receiving a modification to the user information received from the second user from the first user;
   applying, by the identification service, the modification to the user information received from the first user to the user information received from the second user and stored in the data store in association with the first user;
   receiving, by the identification service, a request from the second user for the user information associated with the first user, wherein the request is received by the identification service in conjunction with a subsequent dynamic user identifier associated with the first user;
   mapping, by the identification service, the subsequent dynamic user identifier received in conjunction with the request with the static user identifier to identify the first user;
   locating, by the identification service, the user information associated with the first user stored in the data store on behalf of the second user based on the static user identifier; and
   providing, by the identification service, the user information associated with the first user stored in the data store on behalf of the second user to the second user in response to the request.

2. The computer implemented method of claim 1, wherein presenting the user information to the first user includes automatically presenting the user information in response to receiving the user information from the second user.

3. The computer implemented method of claim 1, wherein presenting the user information to the first user includes automatically presenting the user information in response to receiving the user information from the second user according to a rule established for the first user.

4. The computer implemented method of claim 1, wherein presenting the user information to the first user includes automatically presenting the user interface in response to receiving the user information from the second user according to a rule established in conjunction with a user profile associated with the first user.

5. The computer implemented method of claim 1, wherein presenting the user information to the first user includes presenting the user interface in response to receiving a request from the first user.

6. The computer implemented method of claim 1, wherein receiving the modification to the user information includes receiving a modification to one or more values included in the user information.

7. The computer implemented method of claim 1, wherein receiving the modification to the user information includes receiving a deletion of one or more values included in the user information.

8. The computer implemented method of claim 1, wherein receiving the modification to the user information includes receiving an addition of one or more values to the user information.

9. A non-transitory computer medium bearing computer executable instructions which, when executed by a processor on a computing device, configure the computing device to carry out a method as implemented by an identification service for managing user information regarding a first user, the method comprising each of the following as implemented by the identification service:
   maintaining a data store of the identification service that stores user information regarding a plurality of computer users on behalf of submitting parties;
   receiving, by the identification service, user information about the first user included in the plurality of computer users from a second user, the second user distinct from the first user, wherein the user information is received by the identification service in conjunction with a current dynamic user identifier associated with the first user;
   mapping, by the identification service, the current dynamic user identifier received in conjunction with the user information with a static user identifier to identify the first user;
   storing, by the identification service, the user information in the data store on behalf of the second user in association with the static user identifier associated with the first user;
   presenting, by the identification service, the user information received from the second user to the first user and receiving a modification to the user information received from the second user from the first user;
   applying, by the identification service, the modification to the user information received from the first user to the user information received from the second user and stored in the data store in association with the first user;
   receiving, by the identification service, a request from the second user for the user information associated with the first user, wherein the request is received by the identification service in conjunction with a subsequent dynamic user identifier associated with the first user;
   mapping, by the identification service, the subsequent dynamic user identifier received in conjunction with the request with the static user identifier to identify the first user;

locating, by the identification service, the user information associated with the first user stored in the data store on behalf of the second user based on the static user identifier; and providing, by the identification service, the user information associated with the first user stored in the data store on behalf of the second user to the second user in response to the request.

10. The non-transitory computer readable medium of claim 9, wherein presentation of the user information to the first user is automatically receiving the user information from the second user.

11. The non-transitory computer readable medium of claim 9, wherein the presentation of the user information to the first user is automatically receiving the user information from the second user according to a rule established for the first user.

12. The non-transitory computer readable medium of claim 9, wherein the presentation of the user information to the first user is automatically receiving the user information from the second user according to a rule established in a user profile for the first user.

13. The non-transitory computer readable medium of claim 9, wherein the modified user information comprises one or more values modified by the first user.

14. The non-transitory computer readable medium of claim 9, wherein the modified user information comprises one or more values deleted by the first user.

15. The non-transitory computer readable medium of claim 9, wherein the user information comprises one or more values added by the first user.

16. A computer system for managing user information from a second user in regard to a first user, the computer system comprising a processor and a memory, wherein the processor executes instructions stored in the memory as part of or in conjunction with additional components to:

maintain user information in a data store regarding a plurality of users on behalf of one or more submitting parties;

receive user information about the first user of the plurality of users from the second user, the second user distinct from the first user, wherein the user information is received in conjunction with a current dynamic user identifier associated with the first user;

map the current dynamic user identifier received in conjunction with the user information with a static user identifier to identify the first user;

store the user information in the data store on behalf of the second user in association with the static user identifier associated with the first user;

present the user information received from the second user to the first user and receives a modification to the user information received from the second user from the first user;

apply the modification to the user information received from the first user to the user information received from the second user and stored in the data store in association with the first user;

receive a request from the second user for the user information associated with the first user, wherein the request is received in conjunction with a subsequent dynamic user identifier associated with the first user;

map the subsequent dynamic user identifier received in conjunction with the request with the static user identifier to identify the first user;

locate the user information associated with the first user stored in the data store on behalf of the second user based on the static user identifier; and provide the user information associated with the first user stored in the data store on behalf of the second user to the second user in response to the request.

17. The computer system of claim 16, wherein the processor presents the to the first user automatically in response to receiving the user information from the second user according to a rule established for the first user.

* * * * *